UNITED STATES PATENT OFFICE.

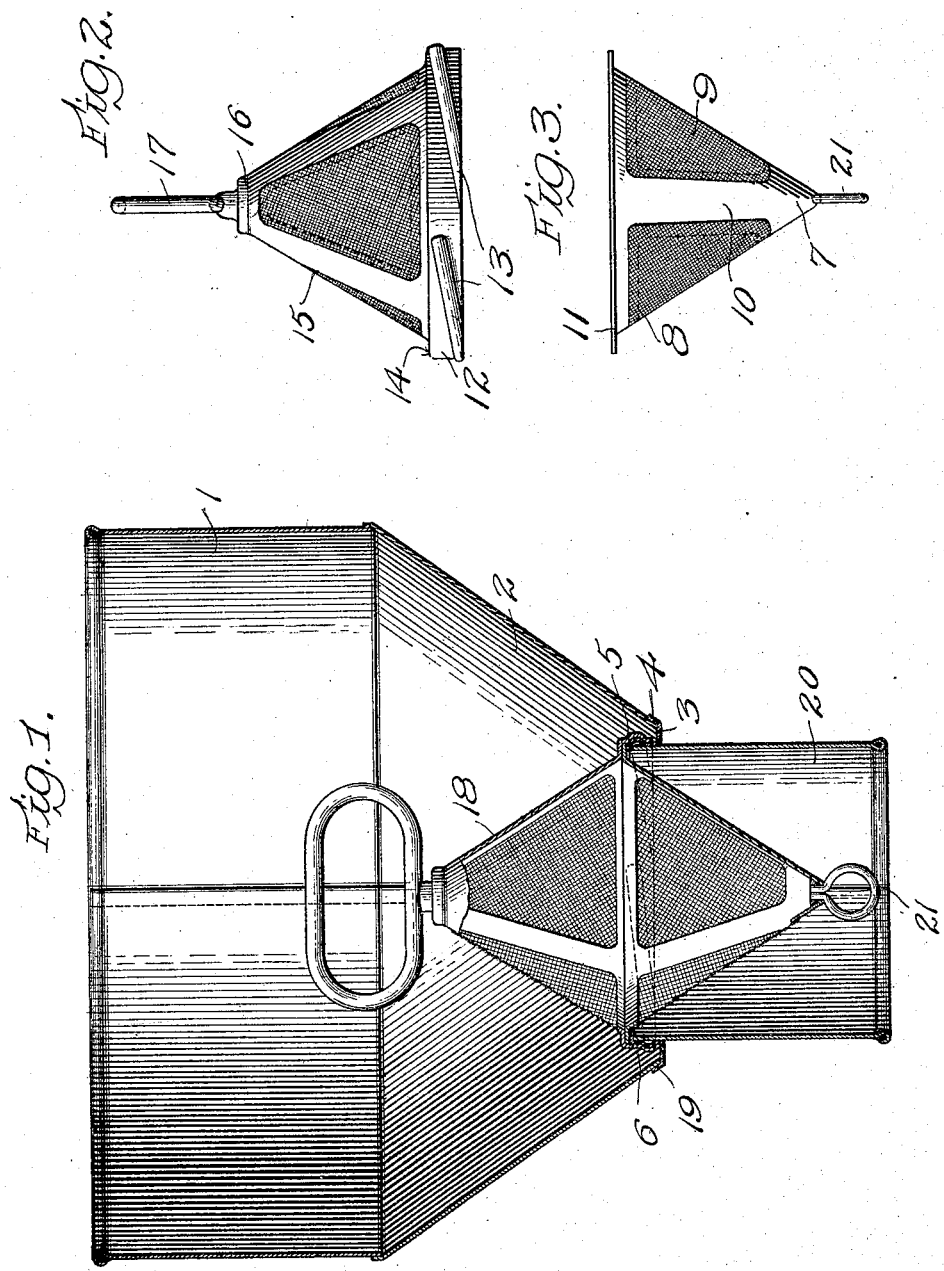

CONRAD EKVALL, OF ELGIN, ILLINOIS.

MILK-STRAINER.

1,185,890.
Specification of Letters Patent.
Patented June 6, 1916.

Application filed August 31, 1915. Serial No. 48,317.

*To all whom it may concern:*

Be it known that I, CONRAD EKVALL, a citizen of the United States of America, residing at Elgin, in the county of Kane and State of Illinois, have invented certain new and useful Improvements in Milk-Strainers, of which the following is a specification, reference being had therein to the accompanying drawing.

This invention relates to a milk strainer and has special reference to a device wherein the several detachable portions thereof may be easily disassembled for facilitating the cleansing thereof.

One object of this invention is the production of a milk strainer wherein the straining portions are separable so as to be easily disassembled when desired but which are normally carried so as to cause the milk passing therethrough to be twice filtered for positively removing the refuse or sediment therefrom.

Another object of this invention is the production of a milk strainer wherein there is provided an upstanding flange for carrying the strainer portions of the device, this flange and strainer portions also constituting a pocket portion wherein the sediment and refuse may be carried after the milk has been filtered.

With these, and other objects in view, this invention consists of certain novel combinations, constructions and arrangements of parts as will be hereinafter fully described and claimed.

In the accompanying drawing: Figure 1 is a central vertical section through the milk strainer, portions of the device being shown in elevation. Fig. 2 is a side elevation of the primary filter. Fig. 3 is a side elevation of the auxiliary filter.

Referring to the accompanying drawing by numerals 1 indicates the body portion of the milk strainer which has the neck 2 fixedly secured upon its lower portion by solder or other securing means.

A collar 3 is positioned upon the lower portions of the body 1 so as to allow the annular lip 4 to extend upon the outer portions of the neck 2 whereby the collar may be fixedly mounted upon the neck 2 by having the annular lip 4 soldered or otherwise secured to the lower portions of the neck. This collar 3 is provided with an upwardly extending flange 5 and upon this flange 5 the supporting rim 6 is integrally formed. It should be noted that the flange 5 is provided with a plurality of threads while the supporting rim 6 extends inwardly, as clearly shown in Fig. 1.

The auxiliary filter 7 is substantially conical in shape, as will be seen by referring to Fig. 3, and has a plurality of cut-out portions 8 for the purpose of providing openings through which the milk may pass. A filtering cloth or mesh 9 may be positioned within the interior of the filter 7 for the purpose of forming closures for the openings 8. It will be seen that by providing the strips 10 the filtering cloth or mesh 9 will be efficiently reinforced and any danger of this filtering element becoming inoperative or falling from its correct position is eliminated. This filter 7 has the annular rim 11 so formed as to rest upon the supporting rim 6 of the flange 5 when the device is in an assembled position. After this auxiliary filter has been placed in its correct position for use, the primary filter may then be placed within the interior of the body 1 and neck 2. This primary filter comprises a base portion 12 having threads 13 formed thereon. An annular rim 14 is formed upon the base 12 and from this rim the supporting stays 15 extend so as to carry the head 16 which supports the handle 17. These stays 15 are adapted to carry the filtering cloth or mesh 18 which is secured thereto in any suitable manner for forming the filtering portions for the primary filter. When this primary filter is in position within the body 1 and neck 2 the base 12 is threaded into engagement with the flange 5 as shown in Fig. 1. At this time, the auxiliary filter will be positioned within the neck so as to depend for a spaced distance therebelow, whereby the weight of this auxiliary filter will be carried by the engagement of the rims 6 and 11. In order to prevent the accidental displacement of the auxiliary filter, the flange or annular rim 14 of the primary filter will bear upon the outer portions of the rim 11 whereby the several sections will be firmly retained in position.

It will be seen that as the milk is poured into the body 1 it will be directed upon the filters by means of the neck 2. The milk will pass through the filtering cloth or mesh 18 of the primary filter and will then pass downwardly and be discharged through the filtering cloth or mesh 9 of the auxiliary filter. As the primary filter is threaded into engagement with the flange 5 of the collar 3, it will be positively capable of retaining the auxiliary filter in its correct position so that any danger of the several portions accidentally falling apart, when in use, will be eliminated.

As the sediment or refuse is removed from the milk by the filtering cloth or mesh 18 it will pass downwardly so as to rest within the pocket portion 19 formed by the lower portions of the neck 2 and the upstanding flange 5. By having this pocket portion to receive the refuse or sediment, the sediment will not cling to the mesh or filtering cloth as additional milk is poured into the filter and thereby the free passage of the milk through the filtering members will be facilitated.

The sleeve 20 may be carried by the flange 5 of the collar 3 by passing the upper portions of the sleeve 20 into the inner portions of the flange 5 whereby the frictional engagement between these two elements will cause the sleeve 20 to be positively retained against accidental disengagement. By the use of this sleeve it will be seen that the milk, after being filtered, may be directed into any desired receptacle while the sleeve will also constitute a support for supporting the milk strainer when it is desired to place the same upon a supporting surface and thereby the auxiliary filter will be protected from accidental injury. It is of course obvious that a loop 21 may be fixedly carried by the lower portions of the auxiliary filter for the purpose of facilitating the removal of the auxiliary filter or the placing of the same in its correct position when so desired, without the necessity of touching the filtering cloth or mesh.

What I claim is:—

1. A milk strainer of the class described comprising a body portion, a converging neck carried by the lower portions of said body, a collar carried by the lower portions of said neck, a flange formed upon said collar, said flange provided with a plurality of threads and terminating in a horizontal supporting rim, an auxiliary filter extending through said neck, said auxiliary filter provided with an annular rim resting upon the supporting rim, a primary filter positioned within said neck, said primary filter provided with a threaded base, and with a rim formed upon said base portion, said threaded base being adapted to be threaded into engagement with the threaded flange whereby said primary filter will be positively retained in position, said rim of said primary filter bearing upon the rim of said auxiliary filter whereby the filters will be positively supported upon said supporting rim of said flange, said filters being capable of being disassembled for facilitating the cleansing of the several portions when desired.

2. A milk strainer of the class described comprising a body portion, a converging neck carried by the lower portions of said body, a collar carried by the lower portions of said neck, a flange formed upon said collar, said flange provided with a plurality of threads and terminating in a horizontal supporting rim, an auxiliary filter extending through said neck, said auxiliary filter provided with an annular rim resting upon the supporting rim, a primary filter positioned within said neck, said primary filter provided with a threaded base, and with a rim formed upon said base portion, said threaded base being adapted to be threaded into engagement with the threaded flange whereby said primary filter will be positively retained in position, said rim of said primary filter bearing upon the rim of said auxiliary filter whereby the filters may be positively supported upon said supporting rim of said flange, said filters being capable of being disassembled for facilitating the cleansing of the several portions when desired, and means carried by said flange and depending for a spaced distance below said neck for constituting a guide for the milk passing through said filters and also shielding said auxiliary filter and preventing accidental injury thereto.

In testimony whereof I hereunto affix my signature.

CONRAD EKVALL.